United States Patent [19]
Iijima

[11] Patent Number: 5,959,276
[45] Date of Patent: Sep. 28, 1999

[54] ISSUING CUSTOMIZED IC CARDS OF DIFFERENT TYPES

[75] Inventor: Yasuo Iijima, Yokohama, Japan

[73] Assignee: Kabushiki Kaisha Toshiba, Kawasaki, Japan

[21] Appl. No.: 08/900,453

[22] Filed: Jul. 25, 1997

Related U.S. Application Data

[63] Continuation of application No. 08/627,381, Apr. 4, 1996, abandoned, which is a continuation of application No. 08/215,572, Mar. 22, 1994, abandoned.

[30] Foreign Application Priority Data

Apr. 12, 1993 [JP] Japan .................................. 5-084620

[51] Int. Cl.⁶ .................................................. G06K 5/00
[52] U.S. Cl. .......................................... 235/380; 235/492
[58] Field of Search .................................. 235/492, 379, 235/380

[56] References Cited

U.S. PATENT DOCUMENTS

| | | | |
|---|---|---|---|
| 4,766,534 | 8/1988 | DeBenedictis | 364/200 |
| 4,767,920 | 8/1988 | Kitta et al. | 235/492 |
| 4,807,282 | 2/1989 | Kazan et al. | 379/284 |
| 4,855,905 | 8/1989 | Estrada et al. | 364/200 |
| 4,877,947 | 10/1989 | Mori | 235/381 |
| 4,891,783 | 1/1990 | Aritaka et al. | 364/900 |
| 4,939,353 | 7/1990 | Iijima | 235/438 |
| 5,136,716 | 8/1992 | Harvey et al. | 395/800 |
| 5,161,256 | 11/1992 | Iijima . | |
| 5,252,812 | 10/1993 | Nakamura | 235/380 |
| 5,349,649 | 9/1994 | Iijima | 395/275 |
| 5,414,835 | 5/1995 | Iijima | 395/550 |
| 5,420,412 | 5/1995 | Kowalski | 235/492 |

FOREIGN PATENT DOCUMENTS

| | | |
|---|---|---|
| 0282992 | 9/1988 | European Pat. Off. . |
| 0451936 | 10/1991 | European Pat. Off. . |
| 61-226875 | 10/1986 | Japan . |
| 62-30040 | 6/1987 | Japan . |
| 62-103742 | 10/1987 | Japan . |
| 62-130040 | 11/1987 | Japan . |
| 63-098723 | 4/1988 | Japan . |
| 63-11483 | 9/1988 | Japan . |
| 63-250726 | 10/1988 | Japan . |
| 63-250789 | 10/1988 | Japan . |
| 63-250790 | 10/1988 | Japan . |
| 63-250726 | 2/1989 | Japan . |
| 1117550 | 5/1989 | Japan . |
| 04042321 | 2/1992 | Japan . |
| 0442383 | 2/1992 | Japan . |
| 4216189 | 8/1992 | Japan . |
| 04321189 | 11/1992 | Japan . |
| 04321191 | 11/1992 | Japan . |
| 05012499 | 1/1993 | Japan . |
| 05020510 | 1/1993 | Japan . |
| 6119501 | 4/1994 | Japan . |

OTHER PUBLICATIONS

IBM Technical Disclosure Bulletin, vol. 27, No. 10B, p. 6323 Mar. 1985 "Programmable Communications Processor".

*Primary Examiner*—Donald Hajec
*Assistant Examiner*—Mark Tremblay
*Attorney, Agent, or Firm*—Pillsbury Madison & Sutro LLP

[57] ABSTRACT

A method and apparatus issues a plurality of kinds of IC cards. A plurality of items of issue information are stored, to be written into a plurality of kinds of IC cards being issued. The kind of the IC card connected to the IC card processing apparatus is determined, based on received information from the IC card. Command data corresponding to the determined kind of the IC card is generated, the generated command data including a function code corresponding to the kind of the IC card and an item of issue information of the plurality of items of stored issue information, and the command data being formed into a format corresponding to the kind of the IC card. The command and data having a converted format prepared by a selected processing method is transmitted to the IC card.

12 Claims, 9 Drawing Sheets

ISSUING CUSTOMIZED IC CARDS OF DIFFERENT TYPES

This is a continuation of application Ser. No. 08/627,381, filed on Apr. 4, 1996 now abandoned, which was abandoned upon the filing hereof, which is a continuation of 08/215,572, filed Mar. 22, 1994, now abandoned.

BACKGROUND OF THE INVENTION

1. Field of the Invention

The present invention relates to a system including a card processing apparatus used, for example, in an application mode in which IC cards functioning as a plurality of different kinds of electronic devices having different interface specifications are received.

2. Description of the Related Art

Recently, as a portable data storage medium, attention has been paid to an IC card including an IC chip having a non-volatile memory and a control device such as a CPU for controlling the memory.

In this type of IC card, commands corresponding to various applications such as a banking system or a shopping system are supported. By using these commands, the area of the memory is divided into a plurality of areas, and data to be used in a predetermined application is stored, referred to, or erased in the corresponding individual area.

A system for using a plurality of file areas prepared by dividing a memory area of an IC card in response to an external command is known in, for example, U.S. Pat. No. 5,161,256.

There is a tendency to standardize some of these commands. Accordingly, compatibility between IC cards designed by different card designers is ensured with respect to the standardized commands.

However, those commands which are not to be standardized are designed voluntarily by card designers. In this case, it is highly possible that commands supported by IC cards produced by different card designers are formatted and encoded in different manners. In other words, it is highly possible that application processes realized by these commands are substantially incompatible.

In addition, even if IC cards are supplied by the same card designer, compatibility may be lost due to change of versions.

SUMMARY OF THE INVENTION

The object of the present invention is to provide a system having a plurality of electronic devices, wherein it is not necessary for such an application operator as a banker or a store clerk to consider the type of applications of IC cards functioning as electronic devices inserted, e.g. in a card processing apparatus, and the application operator is free from such an operation error that an application command not supported by the IC card is executed, with remarkably enhanced operation efficiencies.

According to the present invention, there is provided an electronic device system including a first electronic device and at least one of a plurality of kinds of second electronic devices to be electrically connected with the first electronic device, wherein a second electronic device connected to the first electronic device receives data from the first electronic device and executes processing of the data received, and the plurality of kinds of second electronic devices have different interface specifications, the first electronic device comprising: means for receiving first information relating to a kind of the second electronic device from the second electronic device; means for storing second information being transmitted to the second electronic device; a plurality of conversion processing means for converting the second information stored in the storage means to third information corresponding to an interface specification associated with the second electronic device; and transmission means for transmitting the third information prepared by selectively using the plurality of conversion processing means on the basis of the first information received by the receiving means.

According to the present invention, for example, an application of the first electronic device can be executed by the same operation in a plurality of IC cards functioning as second electronic devices having different interfaces specifications. Accordingly, it is not necessary for the application operator to consider the kind of IC cards, and the application operator is free from such an operation error that an application not corresponding to the IC card is executed, with remarkably enhanced operation efficiencies.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

An embodiment of the present invention will now be described with reference to the accompanying drawings.

Figure 1:
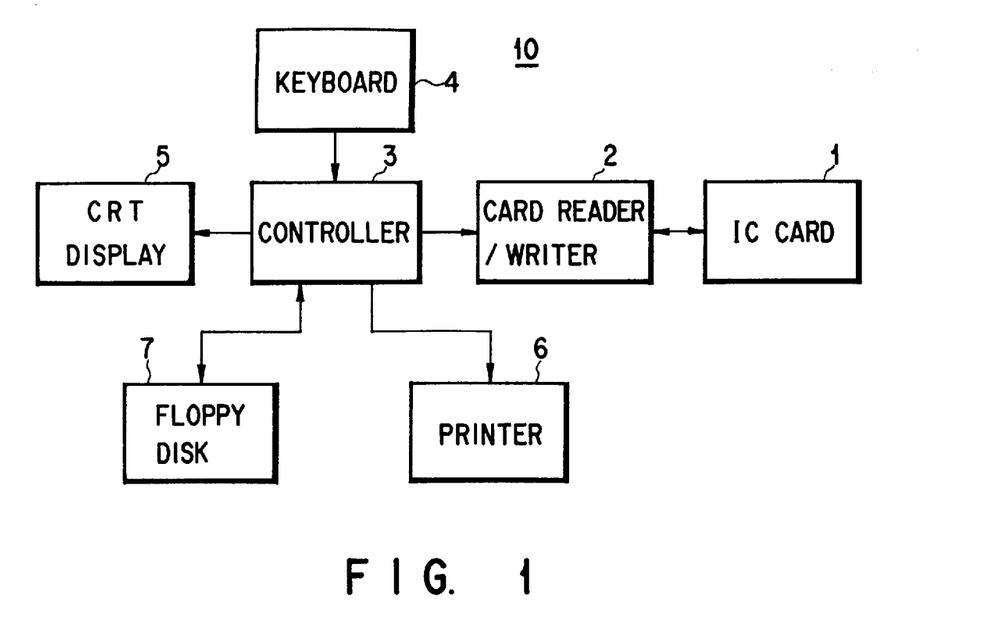
FIG. 1 is a block diagram showing an example of the structure of a card processing apparatus applied to an IC card according to an embodiment of the present invention.

FIG. 1 shows an example of the structure of a card processing apparatus 10 according to the present invention which is used as a terminal device of, e.g. a banking system or a shopping system, to which an IC card functioning as a portable electronic device is applied. Specifically, in this apparatus 10, a controller 3 comprising, e.g. a CPU is connectable to an IC card 1 via a card reader/writer 2, and the controller 3 is connected to a keyboard 4, a CRT display 5, a printer 6, and a floppy disk apparatus 7.

Figure 2:
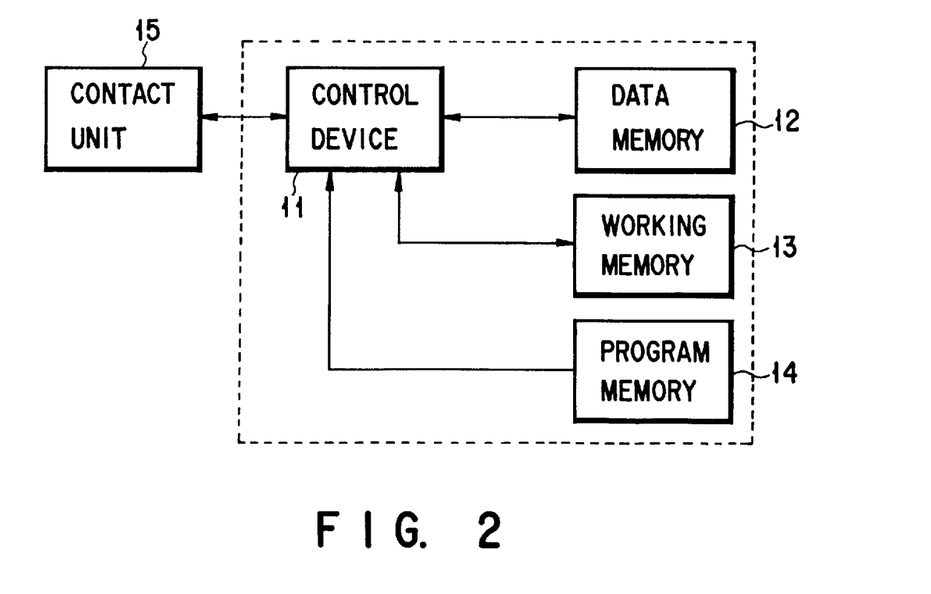
FIG. 2 is a block diagram showing the structure of an IC card.

FIG. 2 shows an example of the structure of the IC card 1. The IC card 1 comprises a control device (e.g. CPU) 11 functioning as a control unit, a non-volatile data memory 12 capable of erasing data stored therein, a working memory 13, a program memory 14, and a contact unit 15 for electrical contact with the card reader/writer 2. Those parts shown within a broken line (i.e. control device 11, data memory 12, working memory 13, program memory 14) are constructed by a single (or a plurality of) IC chip(s) and embedded within the body of the IC card 1.

The data memory 12 is used for storing various data and it comprises, e.g. an EEPROM. The working memory 13 is used for temporarily storing processing data at the time the control device 11 executes processing, and it comprises, e.g. a RAM. The program memory 14 comprises, e.g. a mask ROM and it stores a program of the control device 11.

Figure 3:
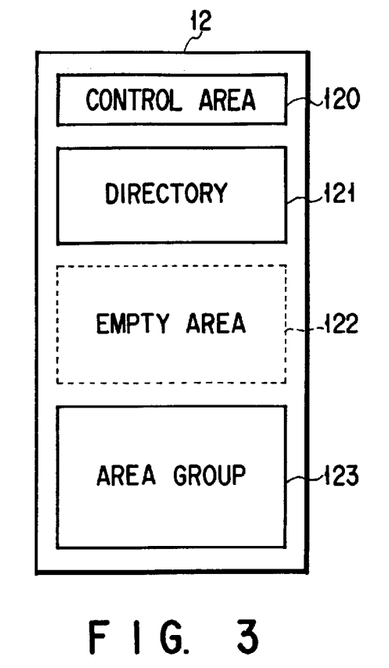
FIG. 3 is a memory map showing an example of the structure of a data memory.

As is shown in FIG. 3, for example, the data memory 12 is divided into a control area 120, a directory area 121, an empty area 122 and an area group 123. Each area is managed by the directory stored in the area 121.

Figure 4:
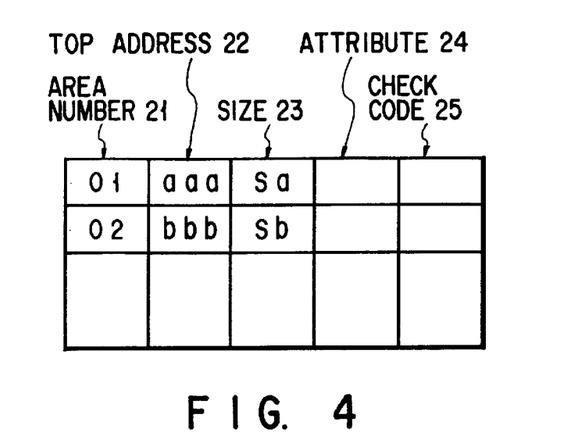
FIG. 4 shows an example of the structure of a directory set within the data memory.

For example, as shown in FIG. 4, the directory is constructed as an assembly of area definition information items comprising area numbers 21 of the respective areas, top addresses 22 of the areas, sizes 23 of the areas, attributes 24 of the areas. If necessary, check codes 25 are added. In FIG. 4, for example, the top address 22 of area [01] is aaa, and the size of area [01] is Sa bytes.

Figure 5:
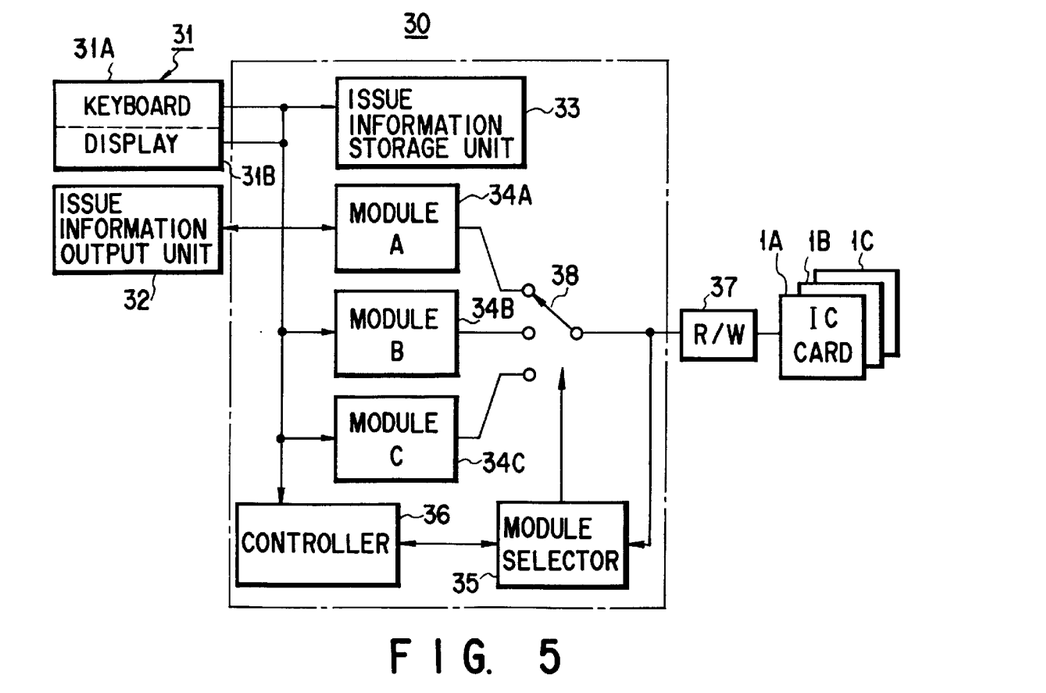
FIG. 5 is a block diagram showing schematically the structure of card issue apparatus constructed as another embodiment of the invention.

Referring to FIG. 5, the functional block structure of an IC card issue apparatus 30 according to an embodiment of the present invention will now be described. Specifically, the card issue apparatus 30 comprises an issue information input section 31 including a keyboard 31A and a display 31B for inputting issue information, an issue information output unit 32 for outputting issue information, an issue information storage unit 33 for storing the issue information input by the issue information input section 31, modules 34A, 34B and 34C for generating, managing and outputting issue commands corresponding to IC cards 1A, 1B and 1C having different specifications of issue commands, a module selector 35 for receiving card identification (ID) information from the IC card for identifying the kind of the IC card and selecting, by means of a switch 38, one of the modules 34A, 34B and 34C which is to be used for issue processing, and a card reader/writer 37. FIG. 5 shows the functional blocks of the card issuing apparatus 30, but the hardware corresponding to the functional blocks is identical to that shown in FIG. 1. For example, the issue information input section 31 having a keyboard 31A and a display 31B corresponds to the keyboard 4 shown in FIG. 4, the issue information output unit 32 to the printer 6, and the reader/writer 37 to the card reader/writer 2. The display 31B is also used as the issue information output unit 32. The issue information storage unit 33 within the card issue apparatus 30 corresponds to the floppy disk 1, but the modules 34A, 34B and 34C, controller 36, module selector 35 and switch 38 are programs executed by the controller 3 or the CPU.

In FIG. 5, each of the IC cards 1A, 1B and 1C connect to the reader/writer 37 is supplied from the card reader/writer 37 shown in FIG. 2 with power supply voltages, ground potentials, clock pulses and reset signals necessary for operations via the contact unit 15, and data is transmitted between the IC cards 1A, 1B and 1C and the modules 34A, 34B and 34C.

Figure 6:
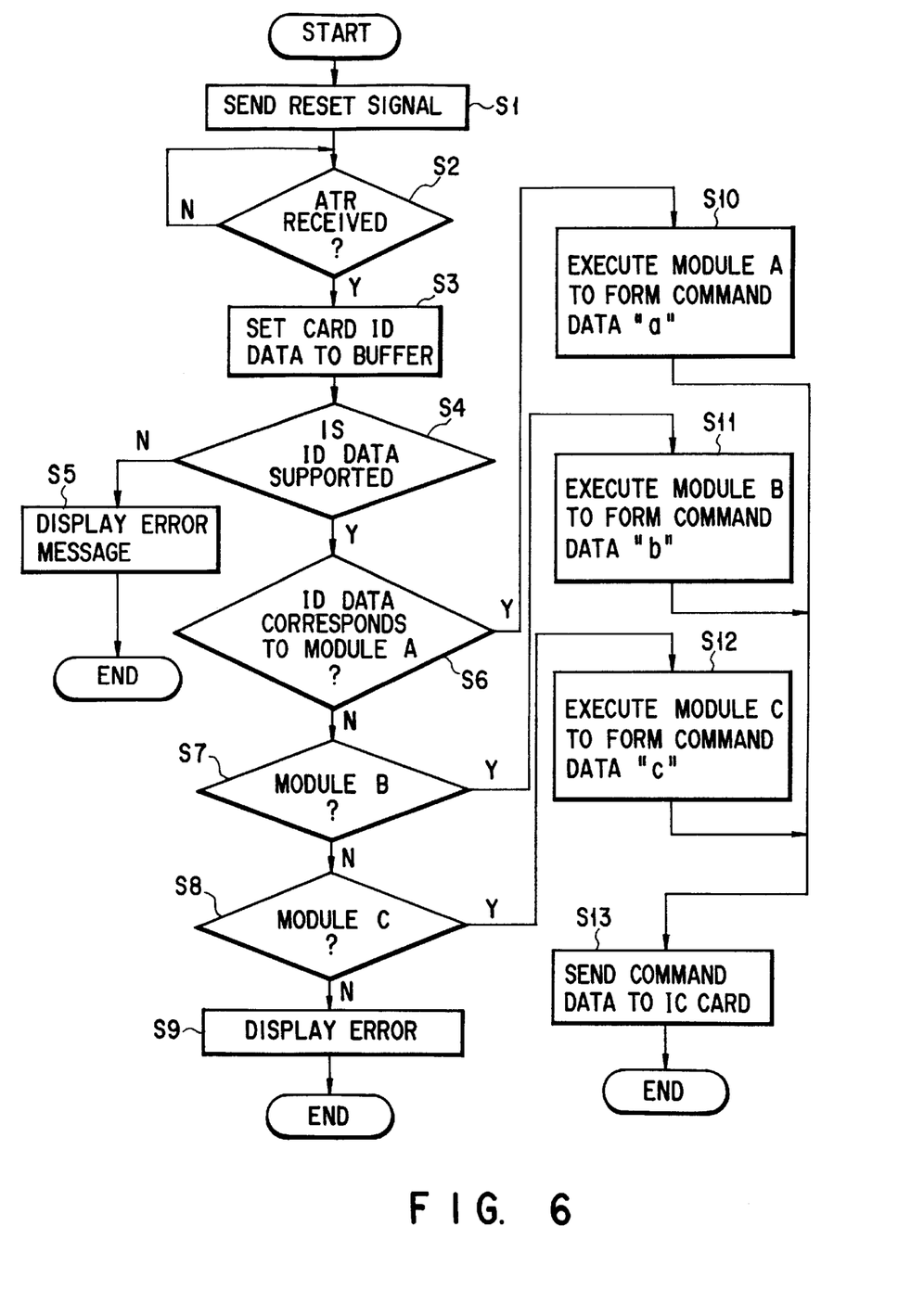
FIG. 6 is a flow chart for illustrating an IC card issue operation to be performed by the card issue apparatus shown in FIG. 5.

The functions and operations of the IC cards in the apparatus 30 shown in FIG. 5 will now be described with reference to a flow chart of FIG. 6. A power supply voltage, a ground potential and a clock pulse are supplied to the IC card 1A, for example, connected to the card reader/writer 37 and, in step S1, a reset signal is sent. Thus, in the IC card 1A, the program stored in the program memory 14 shown in FIG. 2 is activated.

After the program is activated, initial response data ATR (Answer to Reset) is output in step S2. The format of part of the initial response data is defined by a standardizing rule ISO/IEC 7816-3. The other part (historical byte) of the initial response data is defined by the rule ISO/IEC 7816-4.

Figure 7:
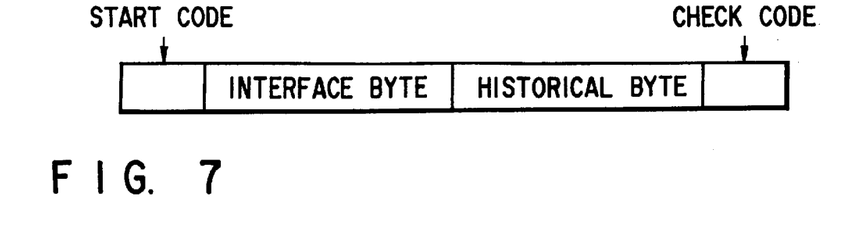
FIG. 7 shows an example of the format of initial response data.

In the IC card used in the present embodiment, the historical byte is employed as the initial response data. Thereby, ID information for discriminating the kind of the IC card is output. The format of the initial response data is schematically shown in FIG. 7. As is shown in FIG. 7, the initial response data comprises a start code at the top, an interface byte for defining the transmission speed/protocol, a historical byte for defining other characteristics, and a check code. The historical byte includes card supplier's ID data constituted by one byte.

In the present embodiment, IC cards 1A, 1B and 1C are to be issued and these cards correspond to card suppliers A, B and C. In addition, numerals "01", "02" and "03" are assigned to the card supplier's ID information items.

When the cards are issued by the card issue apparatus 30, the card issue apparatus 30 requests the card reader/writer 37 to electrically activate the connected IC card, 1A, for example, as described above, and refers to the historical bytes sent from the IC card 1A. The card supplier's ID data is extracted from among the historical bytes and stored in the buffer memory in step S3.

In step S4, it is determined whether the ID data denoting the kind of the IC card 1A is supported by the card issue apparatus 30 (i.e. whether the value is "01", "02" or "03"). If not, a message of "card error", etc. is displayed on the display 31B of the card issue apparatus 30, and the card reader/writer 37 is requested to discharge the IC card 1A. In response, the card reader/writer 37 discharges the IC card 1A.

If it is detected in step S6 that the card ID data corresponds to the module A (described later in detail) supported by the card issue apparatus 30, the module A corresponding to this ID data denoting the kind of the IC card 1A is driven in the next step S10 and command data "a" is generated. Similarly, if the card ID data corresponds to the module B supported by the card issue apparatus 30, the control routine advances from step S7 to step S11 to drive the module B. Thus, command data "b" (described later) is generated. In step S8, if the ID data corresponds to the module C, the control routine advances from step S8 to step S12 to drive the module C and generate command data "c" (described later).

Figure 8:
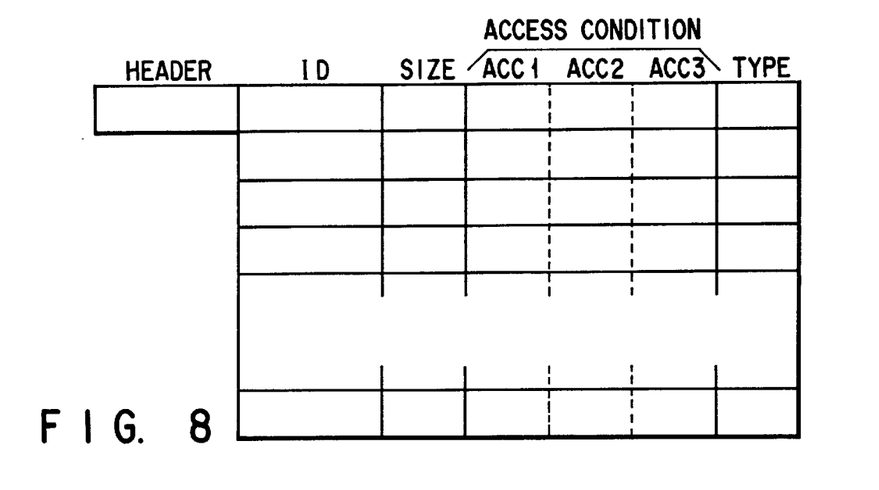
FIG. 8 shows an example of the format of issue information.

FIG. 8 shows an example of the format of the data stored in the issue information storage unit 33. As is shown in FIG. 8, the data stored in the storage unit 33 comprises two-byte header information and a plurality of area information items relating to ID (identification information), size, access condition, and type. In particular, the header information is used to determine the number of subsequent area information items.

The ID and size information items are information items on the card ID and area size assigned to the IC card when the area is formed. The access condition information is the information for designating the key required at the time of accessing to the area formed within the IC card. Three access conditions can be set according to the type of access. The three types of access conditions are (from the left in FIG. 8): access condition ACC1 for referring to the data within the area, access condition ACC2 for adding data within the area, and access condition ACC3 for changing/erasing the data within the area. The type information is one for determining whether data is automatically encrypted in a specified area when the data is written in this area. If the value is "00", the data is written without encryption processing. If the value is "01", the data is encrypted and written.

These issue information items are formed by an input operation of the card issuing person, etc. by means of the issue information input unit comprising the keyboard 31A and display 31B equipped in the card issue apparatus 30.

Figure 9:
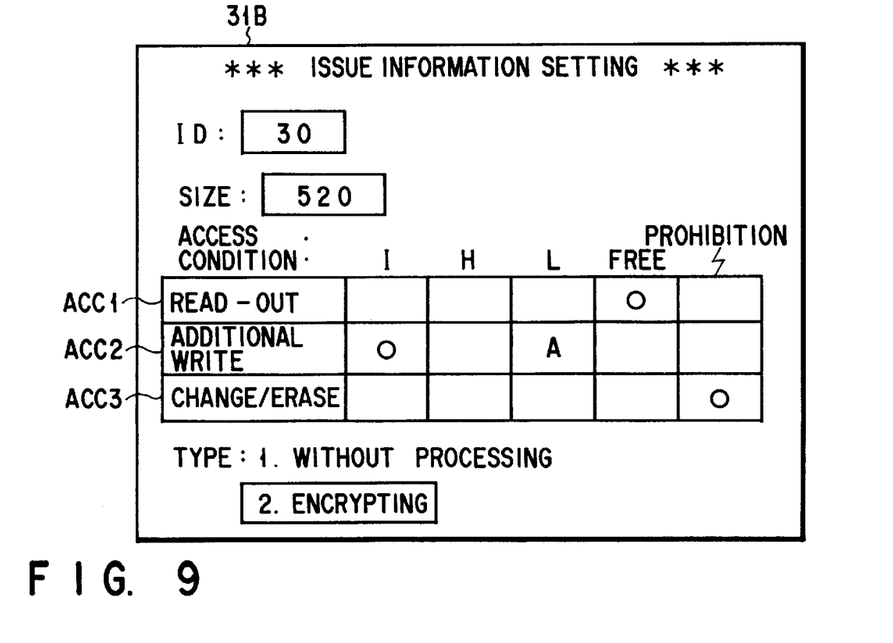
FIG. 9 shows an example of the format of an issue information setting screen.

FIG. 9 shows an example of the display format on the display 31B when the issue information is input. The values of "ID" and "SIZE" are input by means of the keyboard 31A. In this example, the "ID" is set at "30" bytes, and the "SIZE" is set at "520" bytes.

The access condition is set by pointing a related location by a cursor and depressing a space key provided in the keyboard 31A. In FIG. 9, "I" denotes a card issuer key, "H" a card owner key, and "L" a combinational logic of these keys ("A"=AND; "O"=OR). The AND logic in this context means the condition that all designated keys have been coincided, and the OR logic means the condition that any one of the designated keys has been coincided. If condition "FREE" is designated, the access is enabled irrespective of the key coincidence state. If condition "PROHIBITION" is designated, the access is disabled irrespective of the key coincidence state.

In the example of the format set in FIG. 9, the readout access condition ACC1 in the related area is set at "FREE ACCESS", the data additional write access condition ACC2 requires only the coincidence of the issuer key, and the data change/erase access condition ACC3 is set in "PROHIBITION".

In the type information, the mode of data write is selected between "1. WITHOUT PROCESSING" and "2. ENCRYPTING". One of the two modes is selected by using the cursor and set by the space key. In this example, the data is encrypted and written.

Thereafter, the enter key of the keyboard 31A is depressed, and thereby the set issue information is added to the issue information shown in FIG. 8. At this time, the value of ID is stored as it is. The value of the size is stored after it is converted to Hex data. The access condition information is stored in the format shown in FIG. 10 according to the type of access.

Figure 10:
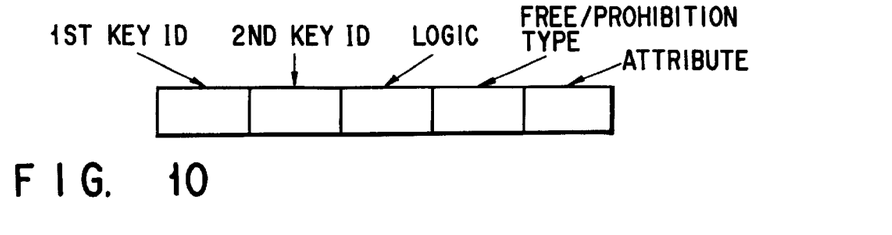
FIG. 10 shows an example of the format of access condition information in the issue information.

In FIG. 10, fields of the first and second keys indicate IDS of designated keys. If the value in the field is "00", this means that there is no designated key. A field of "LOGIC" indicates the AND logic/OR logic mentioned above, corresponding to "01"/"02". A field of "FREE/PROHIBITION TYPE" indicates the free access/access prohibition corresponding to "01"/"02". If neither the free access nor access prohibition is selected, the value "00" is stored.

In a field of "ATTRIBUTE", a value for identifying the designated type is stored. Value "01" is assigned to the type "WITHOUT PROCESSING", and value "02" is assigned to the type "ENCRYPTING".

Figure 11:
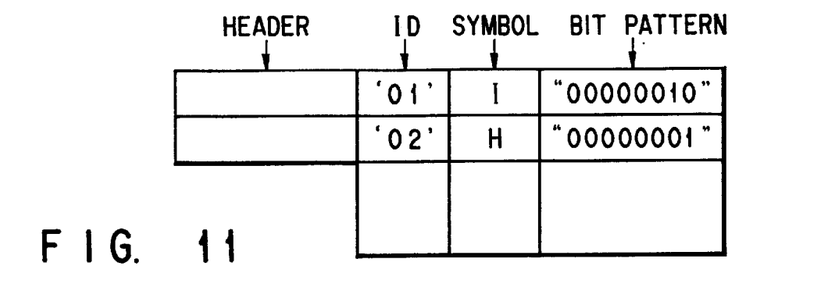
FIG. 11 shows an example of the format of access condition setting reference information.

FIG. 11 shows the format of access condition setting reference information. As is shown in FIG. 11, this format comprises reference information items on the key ID satisfying the access condition, the corresponding symbol, and bit pattern. Headers indicate the structure of the reference information items.

Figure 12A:
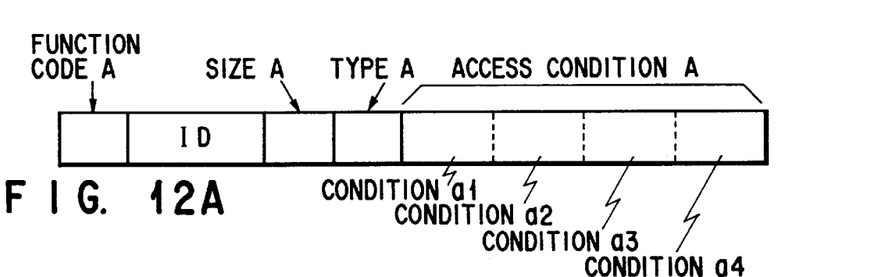
FIGS. 12A to 12C show examples of formats of area creating commands for respective IC cards.
Figure 12B:
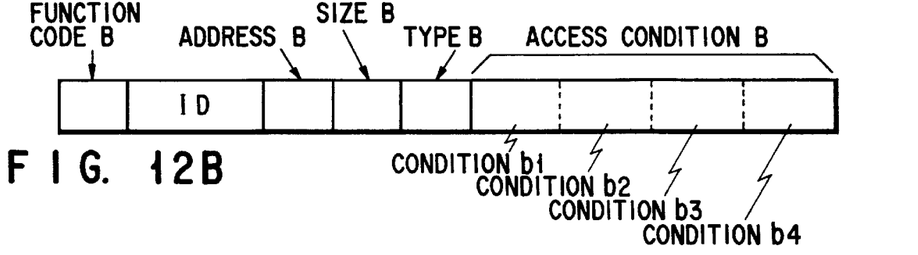
Figure 12C:
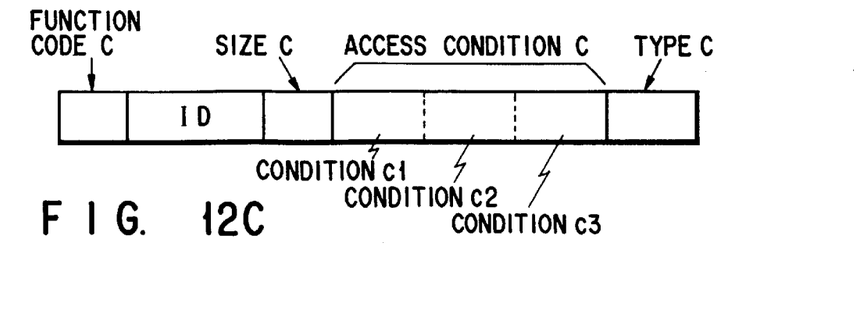

FIGS. 12A to 12C show formats of area creating commands used as commands to be supported by the respective cards. FIG. 12A shows a format of an area creating command for the IC card 1A. This format comprises a function code A indicating an area creating command, ID, size A, type A, and four access conditions A (a1 to a4). Specifically, these access conditions a1 to a4 are (from the left): an access condition a1 for referring to the area; an access condition a2 for adding the contents of the area; an access condition a3 for changing the contents of the area; and an access condition a4 for erasing the contents of the area.

Figure 13:
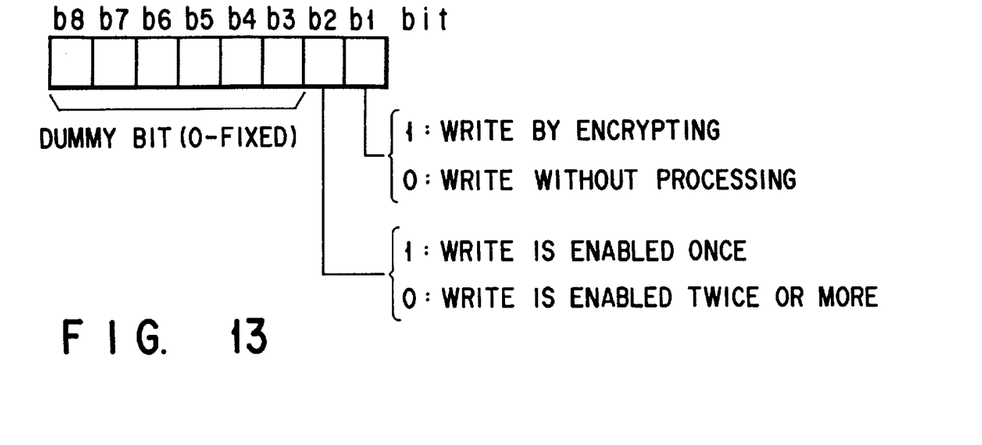
FIG. 13 shows an example of the format of type-A information of an IC card 1A.

The type A data has a format as shown in, e.g. FIG. 13. In FIG. 13, two attribute data items can be set in each area in the IC card 1A. One of the two attribute data items or bit b1 indicates whether input data is to be written after it is encrypted or without encryption processing when a request occurs for writing data in the area. The other attribute data item or bit b2 indicates whether write is enabled one, or twice or more. As is shown in FIG. 13, these attribute data items use the first and second bits b1 and b2 of one-byte type data. The other bits b3 to b8 are dummy bits, are not used and are fixed to "0".

FIG. 12B shows a format of an area creating command for the IC card 1B. This format comprises a function code B indicating an area creating command, ID, address B, size B, type B, and four access conditions B (b1 to b4). Specifically, these access conditions b1 to b4 are (from the left): an access condition b1 for referring to the area; an access condition b2 for adding the contents of the area; an access condition b3 for changing the contents of the area; and an access condition b4 for erasing the contents of the area.

Figure 14:
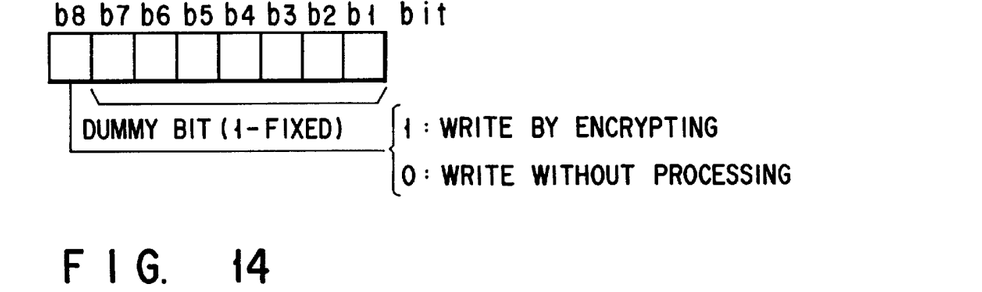
FIG. 14 shows an example of the format of type-B information of an IC card 1B.

The type B data has a format as shown in, e.g. FIG. 14. In the IC card 1B, an area attribute bit b8 indicates whether input data is to be written after it is encrypted or without encryption processing when a request occurs for writing data in the area. As is shown in FIG. 14, the attribute data item uses the eighth bits of one-byte type information. The other bits b1 to b7 are not used and are fixed to "1". With respect to all areas, the number of times of write is set to be twice or more.

FIG. 12C shows a format of an area creating command for the IC card 1C. This format comprises a function code C indicating an area creating command, ID, size C, three access conditions C (c1 to c3), and type C. Specifically, these access conditions c1 to c3 are (from the left): an access condition c1 for referring to the area; an access condition c2 for adding the contents of the area; and an access condition c3 for changing/erasing the contents of the area.

Figure 15:
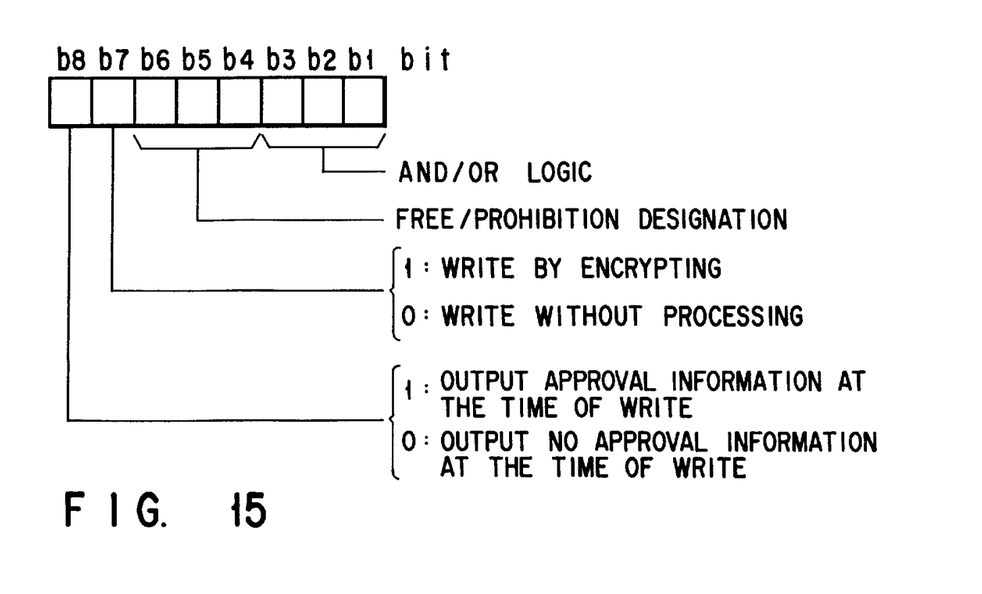
FIG. 15 shows an example of the format of type-C information of an IC card 1C.

The type C data has a format as shown in, e.g. FIG. 15.

In the IC card 1C, an area attribute data indicates whether input data is to be written after it is encrypted or without processing when a request occurs for writing data in the area. As is shown in FIG. 15, the attribute data item uses the seventh bit b7 of one-byte type information. The eighth bit b8 is assigned to data for determining whether approval information for written data is to be output as response data when the data write is completed. This approval data is a result obtained by subjecting the written data to an encrypting process (e.g. a CBC mode process).

Bits b6 to b4 correspond to the access conditions c1, c2 and c3. If value "1" is stored the bits b6 to b4, the free/prohibition condition ("1"/"0") is set in the next bits b3 to b1. If value "0" is stored, the AND/OR logic ("1"/"0") is indicated in the next bits b3 to b1.

With respect to each module, a method of converting issue information stored in the issue information storage unit 33 will now be described.

In the module 34A, the command data having the format shown in FIG. 12A is prepared for each issue information item.

The function code A is set as a top byte, and subsequently the ID information item and size information item are stored in the ID field and size A field. Then, the type data of the issue information is referred to, and the value of the first bit of the type A field is set to determine whether data is to be input after it is encrypted or without processing. The file used in this system allows two or more times of write. Thus, the second-bit b2 value is "0". All of the other bits in the type A field are set to "0".

As regards the access condition A field, the first information item of access condition information of the issue information is set in the condition a1 field, the second information item is set in the condition a2 field, and the third information item a3 is set in the condition a3 field and condition a4 field.

At this time, the free/prohibition field shown in FIG. 10 is referred to, and it is determined whether the value is "00" (neither "FREE" nor "PROHIBITION"). If not "00", the access condition value "00"/"80" corresponding to "01"/"02" is inserted in the related part of the access condition A field.

If the value is "00", the logic field is referred to, and the MSB of the access condition field is set to "1"/"0" in accordance with "01"/"02". Bit patterns corresponding to the first key ID and second key ID are referred to in the access condition setting reference information, and the bit patterns are subjected to an OR logic operation. The resultant value, along with the aforementioned MSB value, is inserted. Thereby, the issue information can be converted to command data (a) shown in FIG. 12A.

In the module 34B, the command data having the format shown in FIG. 12B is prepared for each issue information item.

The function code B is set as a top byte, and subsequently the ID information item and size information item are stored in the ID field and size B field. Specifically, the top address of the file produced by the module 34B itself is set in the address B field. Then, the type data of the issue information is referred to, and the value of the eighth bit b8 (FIG. 14) of the type B field is set to determine whether the data is to be written after it is encrypted or without processing. The file created in the IC card 1B issued by the module B of this system allows two or more times of write. All of the other bits are set to "1".

As regards the access condition B field, the first information item of access condition information of the issue information is set in the condition b4 field, the second information item is set in the condition b3 field, and the third information item is set in the condition b1 field and condition b2 field. The method of producing each access condition information item at this time is the same as in the case of the module 34A. Thereby, the issue information can be converted to command data (b) having a format shown in FIG. 12B.

In the module 34C, the command data having the format shown in FIG. 12C is prepared for each issue information item.

The function code C is set as a top byte, and subsequently the ID information item and size information item are stored in the ID field and size C field. Then, the type data of the issue information is referred to, and the value of the seventh bit b7 (FIG. 15) of the type C field is set to determine whether the data is to be written after it is encrypted or without processing. The file created in the IC card issued by this module of this system allows two or more times of write. The eighth bit is set to "0".

As regards the access condition C field in FIG. 12C, the first information item of access condition information of the issue information is set in the condition c3 field, the second information item is set in the condition c2 field, and the third information item is set in the condition c1 field.

At this time, the free/prohibition field is referred to, and it is determined whether the value is "00" (neither "FREE" nor "PROHIBITION"). If not "00", the bit value ("0"/"1") corresponding to "01"/"02" is set in a predetermined one of bits b1 to b2 of the type C field, and the corresponding bits b6 to b4 are set to "1".

If the value is "00", the corresponding bits b6 to b4 are set to "0", and the logic field is referred to. In accordance with "01"/"02", bits b3 to b1 are set to "1"/"0". Bit patterns corresponding to the first key ID and second key ID are referred to in the access condition setting reference information, and the bit patterns are subjected to an OR logic operation. The resultant value is inserted at a predetermined location of the access condition C field. Thereby, the issue information can be converted to command data (c) of FIG. 12C.

The thus converted command data items (a), (b) and (c) having formats shown in FIGS. 12A to 12C are sent to and stored in the corresponding IC cards 1A, 1B and 1C, and the card issue operation is completed.

The operation of the apparatus shown in FIG. 1 at the time of using the card will now be described in detail with reference to FIGS. 16 and 17.

Figure 16:
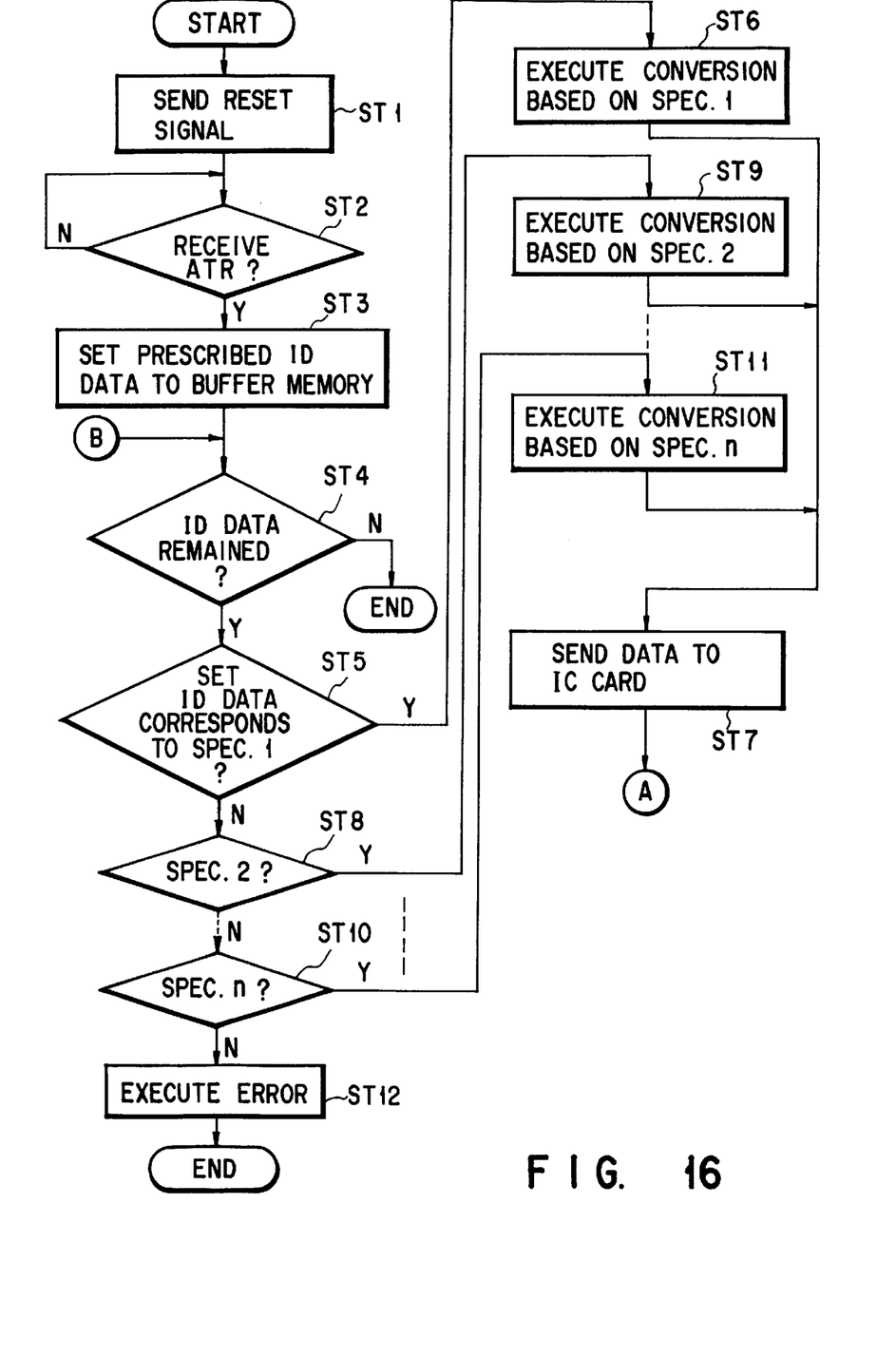
FIG. 16 and FIG. 17 are flow charts for illustrating the operation of the entire apparatus shown in FIG. 1.

Referring to FIG. 16, when the IC card 1A, for example, is inserted in the reader/writer 2 shown in FIG. 1, a reset signal is sent to the IC card 1A from the controller 3 (step ST1). When an answer-to-reset ATR is received in response to the reset signal (step ST2), the card ID data denoting the kind of the IC card 1A included in the ATR is set in the buffer memory within the controller 3 (step ST3).

If there is any card ID data set in the buffer memory provided within the controller 3, it is read out (step ST4). If the read-out card ID data indicates specification 1 corresponding to the first IC card 1A (step ST5), the card ID data is converted to an interface conforming to specification 1 (step ST6). According to the interface obtained by conversion, a predetermined one of the modules is selected and data is transmitted to the IC card 1A (step ST7).

If the card ID data set in the buffer memory in step ST4 is associated with another IC card 1B or 1C, the IC cards 1B or 1C is identified in steps ST8 and ST10 on the basis of the card ID data, and the card ID data is converted to an interface conforming to specification 2, n (n=3, in the case of the card IC) in steps ST9 and ST11. Like the embodiment shown in FIG. 5, the module (module A or B or C) is selected according to the interface obtained by conversion, command data is sent to the other IC card 1A or 1B or 1C in step ST7.

If there is no corresponding interface specification in step ST10, error processing is executed in step ST12 and the control routine ends.

The IC card 1A, to which the command data (a) has been sent in step ST7 in FIG. 16, sends back a response signal to the apparatus 10 according to this command data (a). The response signal is detected in step ST13 in FIG. 17, and it is determined whether the card ID data included in the response signal corresponds to interface specification No. 1 (step ST14). If "YES" in step ST14, the response signal is interpreted based on specification 1 (step ST15). Similarly, in the case of IC card 1B or 1C, it is determined on the basis of the card ID data included in the response signal whether the interface specification is No. 2 (step ST17). If the interface specification is No. 2, the response signal is interpreted based on specification 2 (step ST18). If the interface specification is No. 3, the response signal is interpreted based on specification 3 (step ST19).

If subsequent processing can be executed, the control routine returns from step ST16 to step ST4. If it cannot be executed, the control routine advances to step ST20 and the result of interpretation is output to the displays and displayed thereon.

Figure 17:
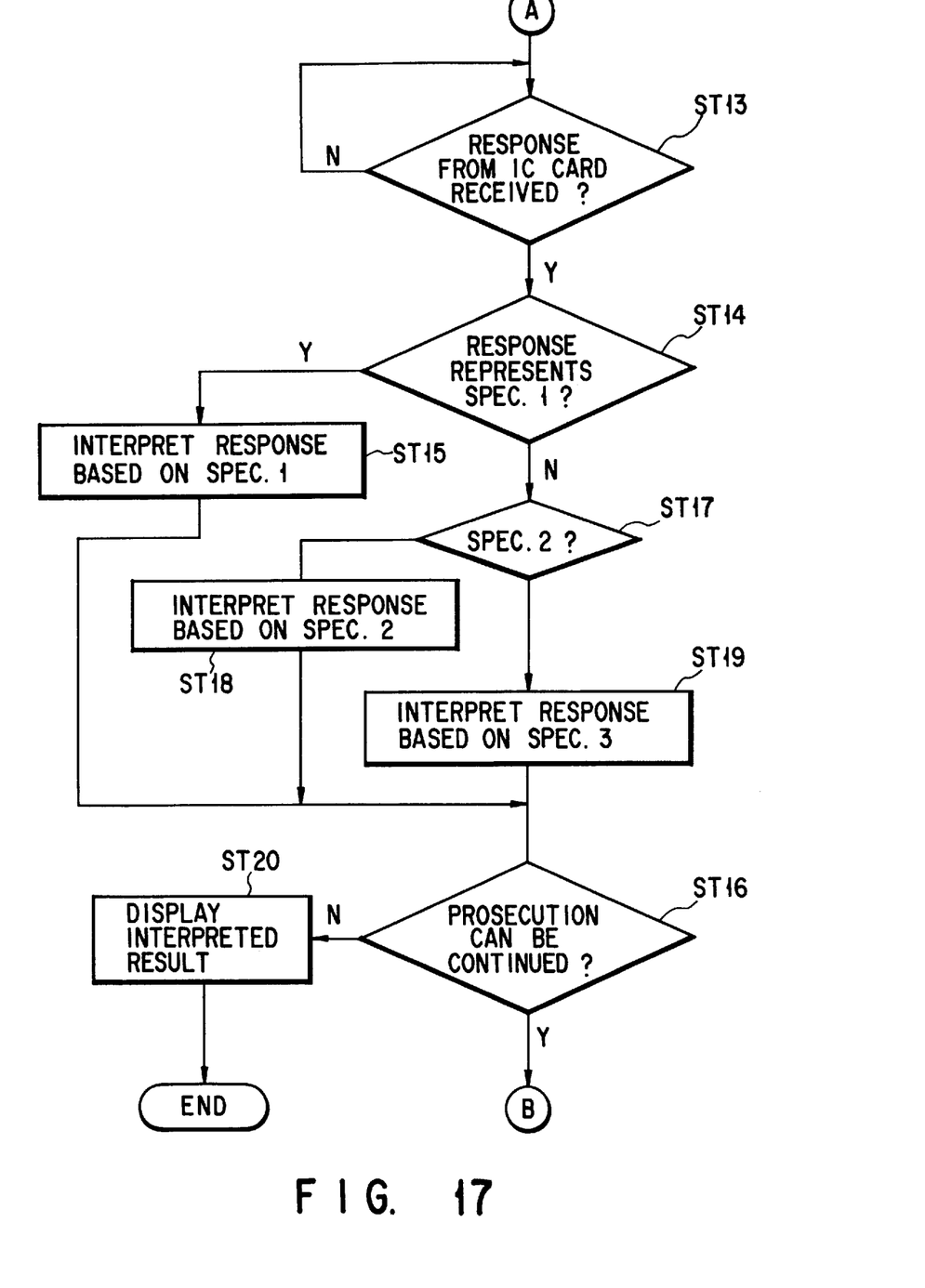

In the operation illustrated in FIGS. 16 and 17, the specification of the inserted IC card is known in advance. If the specification of the inserted IC card is not known, an operation illustrated in FIG. 18 is executed.

Figure 18:
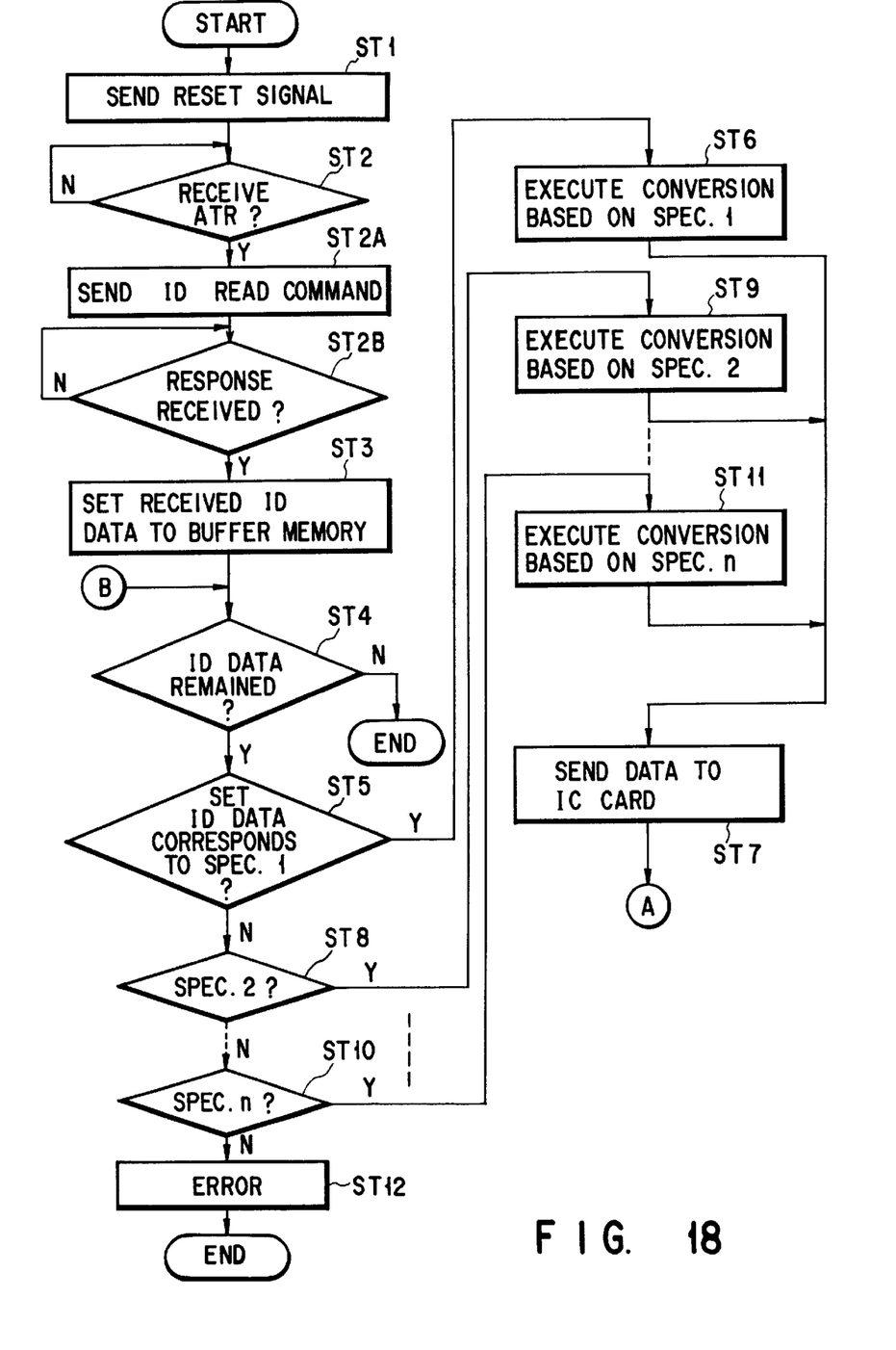
FIG. 18 is a flow chart for illustrating the operation of another embodiment of the invention.

The embodiment shown in FIG. 18 differs from that shown in FIG. 16 only with respect to steps ST2A and ST2B. In FIG. 18, when ATR is received from the IC card 1A, ID read-out command is sent to the IC card 1A from the apparatus 10 (step ST2A). Then, in step ST2B, it is determined whether a response signal including card ID information has been sent back from the IC card 1A. The subsequent operation is the same as illustrated in FIG. 16.

In the above method, common functions and parameters are set in a card processing apparatus, with respect to two or more kinds of cards supporting functions to be set and having other functions, and the processing for issue and use the card is executed by an individual module. Thereby, IC cards having different command specifications can be issued and used by the common operation by a single card processing apparatus.

The access method according to the present invention is applicable not only to commands used in card issuing/using apparatus but also to various commands with different access methods, e.g. in an IC card maintenance system.

The above embodiments have been described on the supposition that different kinds of IC cards are supplied from different makers. However, the present invention is not limited to this and is applicable to the case where different versions of the same kind of IC cards are supplied from the same maker.

In the above embodiments, IC cards are used by way of example as data managing devices. However, the frame of the data managing device is not limited to a card-shaped one, but may be a rod-shaped one, a block-shaped one, etc. The data managing device is not limited to a portable electronic device. In addition, the structure of the data managing device may be modified without departing from the spirit of the invention.

The IC card used in the embodiments includes the contact unit for data transmission with the external device. However, the contact unit may be replaced with a non-contact unit making use of, e.g. light, electric field, magnetic field, etc.

As has been described above, according to the present invention, an application can be executed by the same operation in a plurality of kinds of electronic devices having different interface specifications. Therefore, it is not necessary for an application operator to consider the kind of electronic device such as IC card, and the application operator is free from such an operation error that an application not corresponding to the electronic device is executed. Therefore, there can be provided a data access system for electronic devices with remarkably enhanced operation efficiencies.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An IC card issuing apparatus for handling an IC card being issued, the IC card outputting first information representing a kind of the IC card in response to an inquiry signal sent from said IC card issuing apparatus, said apparatus comprising:

means for sending the inquiry signal to said IC card;

means for receiving, from said IC card, the first information in response to the inquiry signal;

issue information storing means storing a plurality of items of issue information to be written into a plurality of kinds of IC cards being issued;

determining means for determining a kind of an IC card on the basis of first information received by the receiving means;

command data generating means for generating a command data corresponding to a kind of an IC card determined by the determining means, the generated command data including a function code corresponding to the kind of the IC card and an item of issue information of the plurality of items of issue information stored in the issue information storing means, and the command data being formed into a format corresponding to the kind of the IC card; and means for transmitting the command data to said IC card.

2. An IC card issuing apparatus according to claim 1, wherein said inquiring signal includes a reset signal for resetting said IC card; and said IC card transmits to said issuing apparatus an answer-to-reset signal including the first information in response to the reset signal.

3. An IC card issuing apparatus according to claim 2, wherein said answer-to-reset signal includes ID information representing a card issuer.

4. An IC card issuing apparatus according to claim 3, wherein said determining means includes means for detecting whether the ID information is supported in said issuing apparatus.

5. An IC card issuing apparatus according to claim 1, wherein said issue information includes type information for defining whether a memory area of said IC card is an encryption area to which data is written as encrypted data or a normal area to which the data is written as non-encrypted data.

6. An IC card issuing apparatus according to claim 1, wherein said generating means includes a plurality of access modules corresponding to IC cards being issued.

7. An IC card issuing apparatus for handling an IC card being issued, the IC card outputting first information representing a kind of the IC card in response to an inquiry signal sent from said IC card issuing apparatus, said apparatus comprising:

means for sending the inquiry signal to said IC card;
  means for receiving, from said IC card, the first information in response to the inquiry signal;
  issue information storing means for storing a plurality of items of issue information to be written into a plurality of kinds of IC cards being issued, each issue information including ID information of areas formed in the IC card, size information of the areas and type information of the areas;
  determining means for determining a kind of an IC card on the basis of first information received by the receiving means; and
  command data generating means for generating a command data corresponding to a kind of an IC card determined by the determining means, the generated command data including a function code corresponding to the kind of the IC card and an item of issue information of the plurality of items of issue information stored in the issue information storing means, the type information in the issue information being formed into a format corresponding to the kind of the IC card for setting therein the type information and the remaining bit positions to which dummy bits are set.

8. An IC card issuing apparatus including a terminal device and an IC card which outputs first information representing a kind of said IC card in response to an inquiry signal sent from said terminal device, said terminal device comprising:

means for sending the inquiry signal to said IC card;
  means for receiving, from said IC card, the first information in response to the inquiry signal;
  issue information storing means for storing a plurality of items of issue information to be written into a plurality of kinds of IC cards being issued;
  determining means for determining a kind of an IC card on the basis of first information received by the receiving means;
  a plurality of access modules being provided corresponding to a kind of the IC cards, each access module generating a command data having a format corresponding to a kind of an IC card from a function code corresponding to a kind of the IC card and an item of the issue information of a plurality of items of issue information stored in the issue information storing means;
  means for selecting one of said access modules in accordance with the first information sent from said IC card; and
  means for transmitting to said IC card the command data generated by an access module selected by said selecting means.

9. A method for processing an IC card using an IC card processing apparatus electrically connected to at least one of a plurality of kinds of IC cards responding to commands having formats corresponding to the kinds of the IC cards, said method comprising:

storing a plurality of items of issue information to be written into a plurality of kinds of IC cards being issued;
  outputting an instructing signal for instructing the output of information denoting the kind of the IC card to said IC card;
  receiving information indicating a kind of an IC card from the IC card in response to the instructing signal;
  determining the kind of the IC card connected to the IC card processing apparatus based on the received information;
  generating a command data corresponding to the determined kind of the IC card, the generated command data including a function code corresponding to the kind of the IC card and an item of issue information of the plurality of items of stored issue information, and the command data being formed into a format corresponding to the kind of the IC card; and
  transmitting the command and data having a converted format prepared by a selected processing method to said IC card;
  wherein said receiving of information receives from said IC card information denoting the kind of the IC card in response to the command data transmitted from the IC card, and
  said storing of a plurality of items of information stores the information denoting the received kind of the IC card.

10. A method according to claim 9, wherein said instructing signal includes a reset signal for resetting the IC card; and said IC card transmits to said IC card processing apparatus an answer-to-reset signal including the information denoting the kind of the IC card in response to the reset signal.

11. A method according to claim 10, wherein said answer-to-reset signal includes ID information representing a card issuer.

12. An IC card is suing apparatus for handling an IC card being issued, the IC card outputting first information representing a kind of the IC card in response to an inquiry signal sent from the IC card issuing apparatus, the apparatus comprising:

display means for displaying guidance for inputting issue information to be stored in the IC card;
  input means for inputting, as the issue information to be stored in the IC card, ID information of areas formed in the IC card, size information of the areas and type information of the areas in accordance with the guidance displayed on the display means;
  issue information storing means for storing the issue information input by the input means and another issue information to be stored in a plurality of kinds of IC cards being issued;
  means for outputting an output inquiry signal for inquiring as to a kind of information of the IC card being issued;

means for receiving the kind information of the IC card output from the IC card in response to the output inquiry signal;

first determining means for determining the kind of the IC card from the kind information of the IC card received by the receiving means;

second determining means for determining whether or not the IC card is one which can be issued by the card issuing apparatus based on a determination result of the first determining means;

a plurality of command generating means respectively corresponding to the kind of the IC card which can be issued by the card issuing apparatus, each command generating means generating a command data having a format corresponding to a kind of a specified IC card from a function code corresponding to the kind of the specified IC card of an item of issue information of the plurality of items of issue information stored in the issue information storing means;

selecting means for selecting one of the plurality of command generating means according to a determination result of the second determining means; and means for sending the command generated by the one selected by the selecting means to the IC card.

* * * * *